United States Patent [19]
Diekhans

[11] Patent Number: 6,128,574
[45] Date of Patent: Oct. 3, 2000

[54] ROUTE PLANNING SYSTEM FOR AGRICULTURAL WORK VEHICLES

[75] Inventor: Norbert Diekhans, Gütersloh, Germany

[73] Assignee: Claas KGaA, Harsewinkel, Germany

[21] Appl. No.: 08/896,735

[22] Filed: Jul. 21, 1997

[30]   Foreign Application Priority Data

Jul. 23, 1996 [DE]   Germany ............................ 196 29 618

[51] Int. Cl.[7] ................................ G06G 7/78; G06F 7/70
[52] U.S. Cl. .......................... 701/209; 701/50; 701/202; 701/208; 701/210
[58] Field of Search ............................ 701/50, 202, 207, 701/208, 209, 213, 200, 210; 340/990, 995, 988, 689; 342/357, 457, 107; 172/6, 26

[56]   References Cited

U.S. PATENT DOCUMENTS

| | | | |
|---|---|---|---|
| 5,471,391 | 11/1995 | Gudat et al. | 701/50 |
| 5,666,793 | 9/1997 | Bottinger | 56/10.2 |
| 5,771,169 | 6/1998 | Wendte | 702/5 |
| 5,802,492 | 9/1998 | DeLorme et al. | 701/208 |
| 5,832,406 | 11/1998 | Iwami et al. | 701/202 |

FOREIGN PATENT DOCUMENTS

| | | |
|---|---|---|
| 0 618 523 A1 | 10/1994 | European Pat. Off. . |
| 4342171C2 | 1/1996 | Germany . |
| WO 91/09275 | 6/1991 | WIPO . |
| WO 95/16228 | 6/1995 | WIPO . |
| WO 95/31759 | 11/1995 | WIPO . |

OTHER PUBLICATIONS

User's Guide vol. 1, Professional Cadam Machining Center, Dassault Systems of America Corp, Third Edition, Dec. 1993, pp. 1 to 3 and 250 to 267.

*Primary Examiner*—Jacques H. Louis Jacques
*Attorney, Agent, or Firm*—Michael J. Striker

[57]   ABSTRACT

The route planning method for agricultural work vehicles having a definite working width for generation of at least one work path or track over a field includes inputting at least one field-specific datum and at least one work vehicle-specific datum into an electronic data processing unit; providing a computational algorithm in the electronic data processing unit for generation of the at least one work path or track, which includes at least one optimization criterion for the at least one work path or track and generating the at least one work path or track by executing the computational algorithm to obtain the at least one work path or track in the form of at least one digitized work route for one or more work vehicles using the at least one field-specific datum and/or the at least one work vehicle-specific datum. A guidance apparatus for performing the method is also described.

41 Claims, 6 Drawing Sheets

ROUTE PLANNING SYSTEM FOR AGRICULTURAL WORK VEHICLES

BACKGROUND OF THE INVENTION

The present invention relates to a route planning system, more particularly to a route planning method and apparatus, for agricultural work vehicles, for example for a combine or harvester-thresher, having a definite working width on a field.

Since the operating efficiency of agricultural work vehicles is to be increased, the usage plan/organization of the work for a high-performance work vehicle, such as a combine, and also other agricultural work vehicles including a fertilizer spreader, sowing work vehicle, field chopper, mower, tedder, swath-forming work vehicle, and the like, is of ever increasing significance. Only a limited number of harvesting hours are available during the grain harvest due to weather conditions, which often are not used in an optimum way because of a poor usage plane. Also a precise usage plan is important for other agricultural work vehicles in order to achieve the theoretical efficiency of the work vehicle also in practice.

A method for fertilizing agriculturally useful surfaces using work vehicles, which are equipped with a GPS satellite receiver for position determination, is described in German Patent Application 43 42 171. The travel path to be covered is prepared and displayed on a control monitor for the driver together with the momentary position of the working work vehicle. Thus the driver can check at an time, whether the field region worked up to now is error-free, which means worked without omission of some parts, or whether certain field regions have still not been worked. This system provides the current knowledge of field working errors, whereby the time required for an expensive search for errors and correction of them is saved. However a usage plan for optimizing work vehicle duty is not possible with this process.

SUMMARY OF THE INVENTION

It is an object of the present invention to provide a route planning system or method for generation of a work travel course or path of an agricultural work vehicle or vehicles on a field in order to improve the operation or duty of the agricultural work vehicle and, for example, to improve utilization of the limited available harvest time or the theoretical efficiency of the work vehicles by optimizing the travel plan as much as possible.

According to the invention, the method includes storing one or more field-specific data, especially coordinates for the field peripheral edges, and one or more work vehicle-specific data, such as the working width, the mechanism width or the tire width, weight, tank volume, boundary inclination angle and natural inclination angle, in an electronic data processing unit (CPU/Computer). The working travel course for the work vehicle is generated in the form of a digitized treatment or processing route in the electronic data processing device with the aid of a computational algorithm, which has at least one optimization criterion for the work or process route.

The process route is displayed for the driver by a monitor arranged in the work vehicle. The optimized planned, digitized process or treatment route forms the basis for a tracking system for the agricultural work vehicle in combination with a real-time position determining system arranged in the work vehicle, especially a GPS satellite navigation system. For this purpose the digitized process route is transformed into the coordinates of the real-time position determining system installed in the work vehicle. The digitized process route supplies the desired or set value for the track or travel path.

Besides the above-described route planning system, where the process route is generated with the aid of a computational algorithm with an optimization criterion, the method according to the invention includes manually editing the process route, for example with a CAD system. The field peripheral edge is represented on the monitor with the aid of a computer-supported drawing program. Subsequently the travel path or course is generated automatically considering the working width inside the boundaries of the field, or edited by an operator. A digitized work route is prepared with the help of the indicated travel path and a digitized work route is transformed into the coordinates of the real-time position determining system installed in the work vehicle.

An optimum duty and usage plan for an agricultural work vehicle is attainable with the combination of the route planning and tracking. Also the economic efficiency of the work vehicle being used is increased by the planning and maintaining of optimum tracking, since, e.g., almost the entire cutting mechanism width is utilized. Furthermore operating materials, such as fuel, seed materials, fertilizer or plant protecting materials are saved. Increased emissions of plant protecting materials and fertilizer are avoided. Also turning times may be saved with optimum route planning and multiple passes over field sections may be avoided, which simultaneously avoids and an undesirable packing of the ground by multiple passes with heavy units.

In the following the field-specific data which are to be considered are described. The coordinates of the field peripheral edge can be input from a field map or cadastral chart, which can occur by optical screening by means of a scanner or by manual scanning by means of a digitizing pen. Further the field peripheral edge can be detected by traveling over it with a work vehicle, which has a position determining device, especially a satellite navigation receiver (GPS receiver), in which the position of the work vehicle is detected and is stored continuously during the travel around the edge. Analogously it is also possible to detect the field peripheral edge when a person is sent around the field edge with a mobile GPS receiver, whereby the position is continuously detected and stored during his or her travel. The field peripheral edge can be determined by giving all corners of the field in the case of a many-cornered field. Furthermore in the case of rectangular or triangular fields the field edge can be determined by giving the side edge lengths.

The following features are also part of the field-specific data:

digital land relief, i.e. height information for the field peripheral or bounding edges,or information regarding the critical slope or inclination of the ground in the field, the position and size of the hindrances for an agricultural machine traveling over the field, such as trees, stones, brooks, pools, power line poles or masts or the like on the field, information regarding areas bordering on the field to be worked (other fields, paths, roads), which can be used for example for turning maneuvers, information regarding harvest yield per unit area of the field, information regarding the harvest yield cadastre of the field, information regarding the type of crop harvested, information regarding the type of soil and soil properties, a soil property cadastre of the field and information regarding fixed harvested goods-unloading positions.

Further it is provided that the field-specific data include earlier or past work course plans in the chronological order by which the field was worked. For example the field-specific data for the route planning system of a harvesting machine includes the work path of past working of the field by seed planting vehicles. The travel paths for successive workings of the field can be planned for soil conservation so that the tire tracks are side-by-side and so that various zones or regions of the field are compacted during the working process.

The parts of the work vehicle-specific data besides the working width of the work vehicle include the following:

geometric dimensions of the work vehicle, information regarding reaction of the work vehicle to a predetermined impact or deflection of the steering axle(turning circle), information regarding drive performance of the work vehicle and/or information regarding efficiency or performance of the working devices on the work vehicle, maximum speed of the work vehicle, information regarding optimum vehicle speed for the work vehicle as determined by the given soil conditions, in the case of a harvesting machine: information regarding optimum vehicle speed for certain crop types, information regarding optimum vehicle speed for the work vehicle as determined by certain crop yield densities, information regarding cost of consumed materials, for example fuel, seeds, liquids to be applied to the field, information regarding fuel tank capacity, information regarding grain tank capacity of a combine or of an accompanying carting vehicle, information regarding grain tank emptying speed, information about maximum usage time, which is limited for example by maintenance intervals, and other information including travel track with, travel lane width and tire width, border inclination angle and slope angle.

The route planning system is in a position to consider several work vehicles with the same or different work vehicle-specific data.

The optimizing criteria for generating the process route includes the following points:

determination of the shortest route, determination of the fastest route, determination of the route that saves the most fuel, for a harvesting machine receiving harvested goods:
minimizing lost time and/or vehicle travel for unloading/dispensing of harvested material,
determination of the safest route,
for a work vehicle dispensing seed materials, fertilizer materials, plant protecting materials or weed killing materials: minimizing of lost time and/or vehicle travel for the loading of the materials to be dispensed, and
ground conservation and avoidance of ground compression.

These optimization criteria can also be combined with each other.

The route planning system for a combine or harvester-thresher advantageously indicates the position/positions, at which the grain tank of the combine is estimated to be filled. Furthermore the route planning system is determined for a satisfactory parallel refueling vehicle course or path for refueling of a harvesting machine with a parallel traveling refueling vehicle.

Instead of performing a uniform route plan for an entire field, the route plan can be performed also only on one or more sections of the field. Thus a field can be divided into certain portions and an individual route plan can be performed for each portion. Moreover regions around field hindrances or field edge regions can be omitted, for example.

With the aid of the field peripheral edges a computation of the entire area can be performed in the route planning system. This can occur, e.g., by numerical integration. Advantageously the computation of the area occurs considering field height relief or variation, since especially the projected area varies considerably from the actual area in the case of hilly land. Additionally the area still to be worked can be calculated at each position on the working route. A portion division can be performed parallel to vehicle roads and/or whole number multiples of the entire working width (e.g. cutting width of a combine). Furthermore the route planning system can generate a coordination plan for many work vehicles on a field, in which the travel sequence of the work vehicles, which considers spacing or interval in the travel direction and displacement transverse to the travel direction. Advantageously the route planning system includes working paths for turning maneuvers (e.g. 180° to 90° turning maneuvers).

In one embodiment the working route is prepared in an electronic data processing device of a yard station (yard computer). The route prepared in the yard computer is transferred by means of a portable data carrier (e.g. diskette, chip card, PCMCIA-card) to an electronic data processing unit (vehicle computer) aboard the work vehicle. A transmission of the data via radio computer is also possible. In an additional embodiment the work route is prepared on the electronic data processing unit (vehicle computer) aboard the work vehicle. The field-specific and/or work vehicle-specific data is transferred to the work vehicle computer by means of a portable data carrier for preparation of the work route. Also here too radio data transmission is possible.

Furthermore the work-specific data are stored in the vehicle computer and are retrieved for preparation of the work path. Also manual input of the work vehicle-specific and/or field-specific data is possible. Work direction vectors are computer with the aid of the working sequence of coordinates of the digitized work route in real time positioning systems. Thus each coordinate point of the digitized work route is associated with at least one work direction vector. The coordinates (reference point) of the digitized work route in a real time system can designate the center of the work vehicle or the work device arranged on the work vehicle. Furthermore the coordinates can designate the left or the right boundary position of the working device arranged on the work vehicle, e.g. left blade part cutting edge in the cutting mechanism of a combine.

Agricultural work vehicles have a highly precise real time position system for determining the position and direction vector of vehicle motion for tracking on a field. The momentary position and motion direction of the work vehicle is indicated as an actual value, advantageously in vector representation, on a graphical display device (monitor) arranged in the work vehicle. These values can designate position on the working device arranged on the work vehicle. Additionally the working path of a planned, digitized work route (set value) over the field is provided on the monitor of the work vehicle. Thus it is possible for the driver, by observing the monitor to determine whether it is found, or not, on the planned work route and, if necessary, perform the required steering correction.

The set value and actual value are fed to an electronic analysis unit of the work vehicle, where a steering signal is generated by comparison of the set value with the actual value. The set position and a set work direction vector are part of the set value. The actual position and the motion direction of the vehicle are part of the actual value.

The steering signal produced by the set value/actual value comparison can be indicated to the driver optically and/or acoustically, so that it can rapidly react when a variation occurs.

In a further embodiment the steering signal is input to an automatic steering control device in the work vehicle. During an automatic steering maneuver the vehicle speed is automatically reduced in an advantageous manner in order to obtain a certain steering stability.

Information regarding the position and size of hindrances is input into the work route for the tracking to consider the field hindrances. The hindrance data from the work route can be used for an automatic height regulation of the work devices arranged on the work vehicle, so that the hindrance can be passed with a partially lifted work device. Additionally the hindrance can be announced to the driver on the monitor.

The exact determined position of the GPS-receiver antenna on the work vehicle can transformed to the left or right border position of the work tool or device arranged on the work vehicle, e.g. the left blade part cutting edge in the cutting mechanism of a combine, as a reference-actual value. Of course a transformation to another point on the work device is also possible. For improvement of the steering stability it is advantageous to transform the exactly determined position of the GPS-receiver antenna on the work vehicle as the reference-actual value to a virtual point leading the work device in the travel direction.

A PDGPS-system (Precise Differential GPS) is advantageously used as real time positioning system. Because of that in case of a GPS failure the position determining system can also be a coupled navigation system comprising a PDGPS-system and various auxiliary sensors (wheel sensors, speed measuring sensors, steering angle sensors, direction sensors, such as piezocrystals) arranged in the work vehicle. In order to guarantee a high operational safety and reliability o the tracking system, a harvested goods edge orienting system passed on reflex positioning or locating (e.g. laser scanners) can also be present. Also a harvested good row orienting system based on touch or contact can be used.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
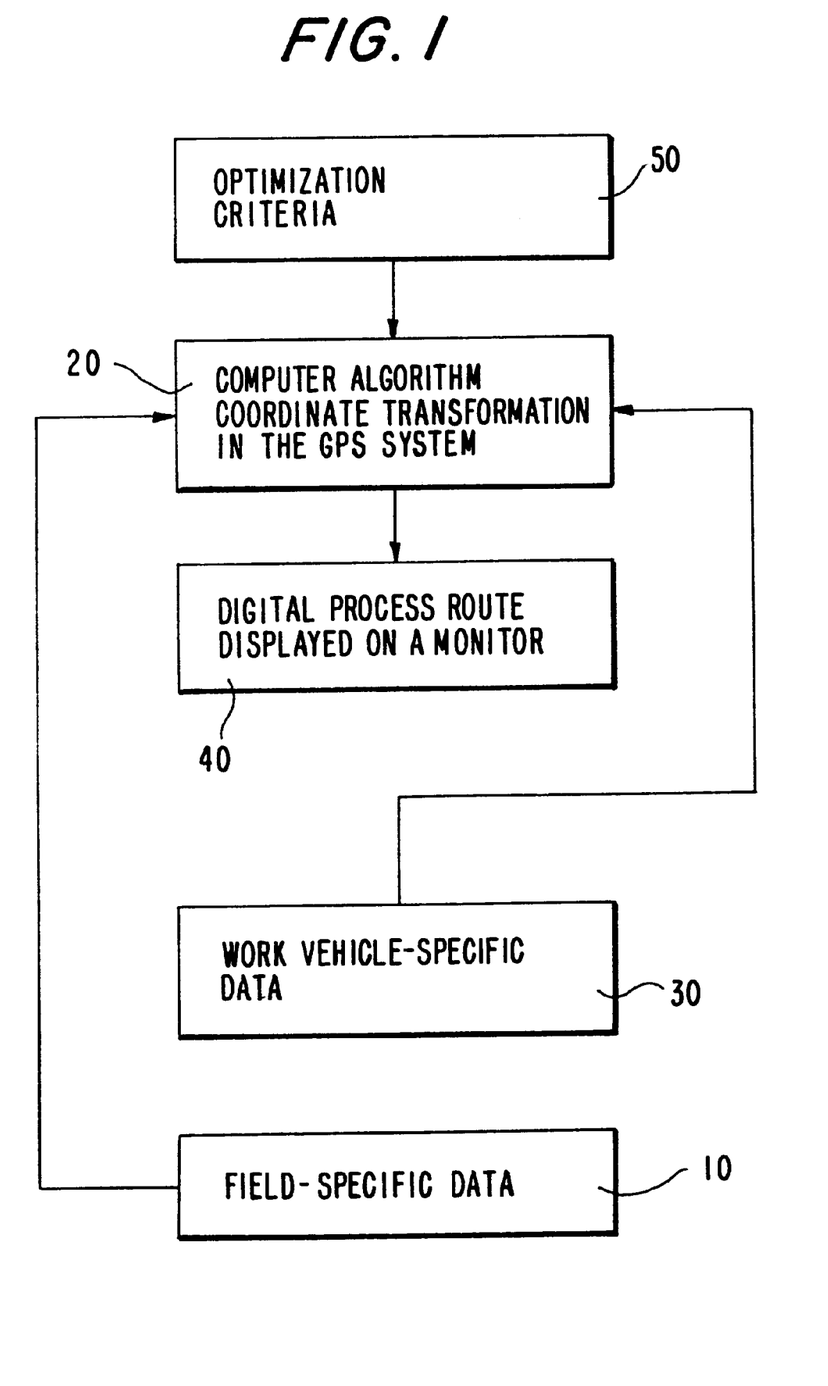
FIG. 1 is a block diagram of the automatic route planning system according to the invention.

A block diagram of the automatic route planning system is shown in FIG. 1. The field-specific and the work vehicle-specific data are input in method step 10 and method step 30 respectively shown in FIG. 1 as boundary values in an electronic data processing unit (Yard/Vehicle Computer/On-board computer), in which the computational algorithm is implemented. After a coordinate transformation described in more detail below, a route for the agricultural machine, i.e. a work path or track, is generated in step 20 by executing the algorithm together with an optimization criteria (e.g. shortest distance traveled) input in method step 50. The calculated route may be displayed with field boundaries in method step 40 on a monitor screen for interactive editing by an operator in step 40 shown in FIG. 1 (see also FIG. 8).

Figure 2A:
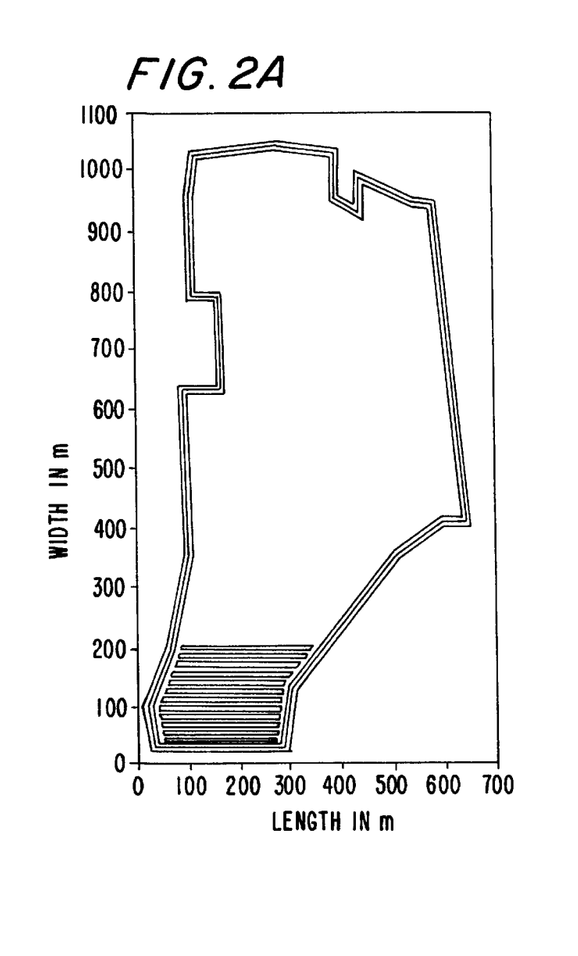
FIGS. 2A and 2B are examples of work paths for work vehicles over a field.
Figure 2B:
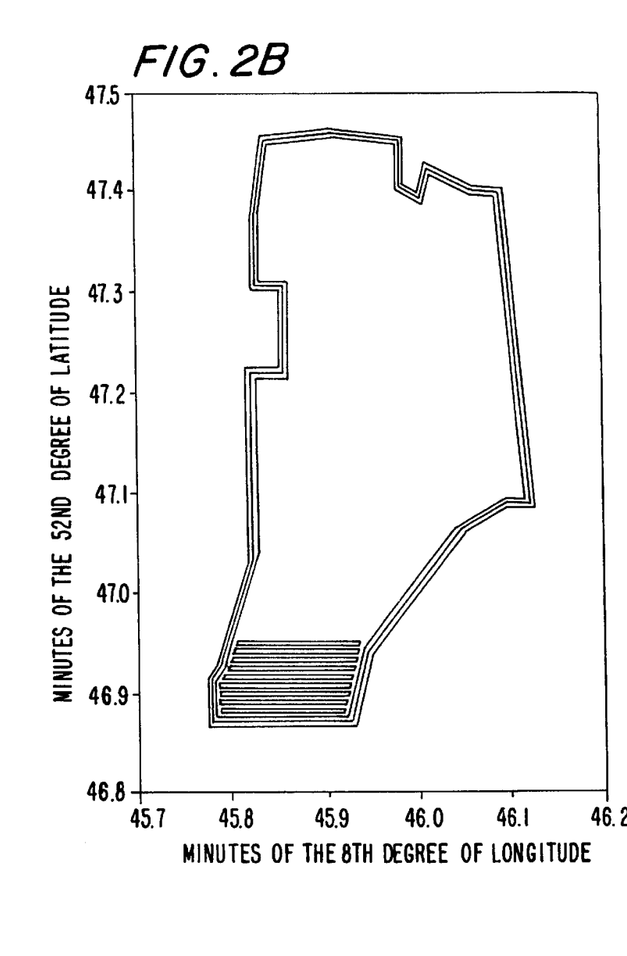

In FIG. 2A and 2B the planned work path are illustrated on a field—once in relative coordinates (FIG. 2A) and once in absolute coordinates of the GPS system (FIG. 2B). For the transformation of the relative coordinates into the absolute coordinates performed in step 20 in FIG. 1 the following equation (1) holds for length and the following equation (2) for width holds:

$$\phi_{absolute}=\phi_{reference}+[\phi_{relative}/\{1851.85 \text{ m/min}\}] \quad (1),$$

$$\lambda_{absolute}=\lambda_{reference}+[\lambda_{relative}/\{\text{Cos } \beta \cdot 1851.85 \text{ m/min}\}] \quad (2),$$

wherein β=width in degrees.

The plan for the vehicle work path or course in FIG. 2A, B was carried out with the help of a CAD program for NC machines. The field was simulated by a workpiece and the agricultural work vehicle by a tool, e.g. a tilling or cutting head. The field outline is in the form of a card, so that the corner points with reference to a selected coordinate system could be input. Subsequently the vehicle travel path or track was drawn considering a selected working width of 6 m. The track is essentially the path over which the center of the work vehicle travels. The produced track was then defined as the path of the work vehicle, so that the CAD program could calculate the coordinates for the NC machine. The outer line shows the field edge or periphery, a portion of which equal to three times the working width was traveled. The other interior tracks are for example in the lower portion of the field.

Figure 3:
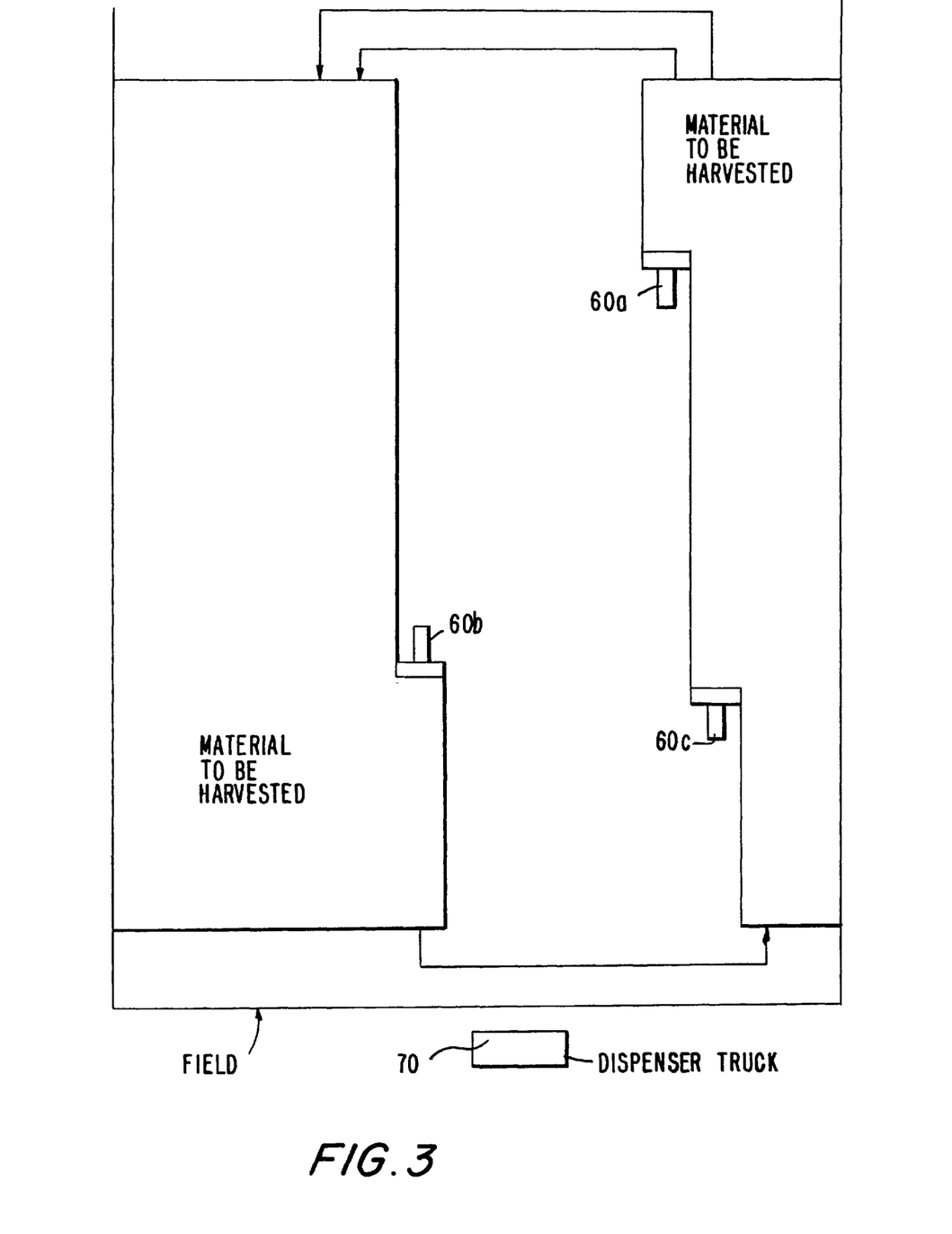
FIG. 3 is an example of a field divided into field portions or sections.

In FIG. 3 a field divided into portions or sections is shown, on which three combines 60a, 60b, 60c are used for harvesting. The coordinate plan for the combine may be generated with the automatic route planning system in which the vehicle travel sequence of the combine, the spacing in the travel direction and the displacement transverse to the travel direction are considered.

Figure 4A:
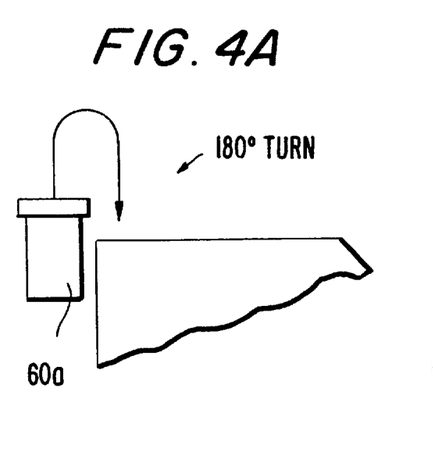
FIGS. 4A and 4B are diagrammatic illustrations of turning maneuvers.
Figure 4B:
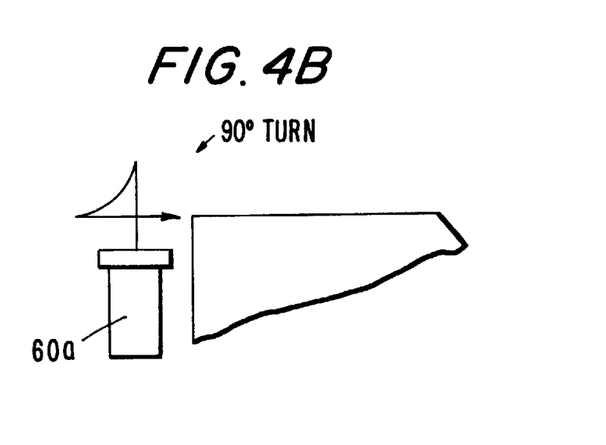

FIG. 4A, 4B for example shows two turning maneuvers of the combine 60a (180° and 90° ⋮ turning maneuvers). This type of turning maneuver is integrated into the route planning system, for example as a subroutine.

Figure 5:
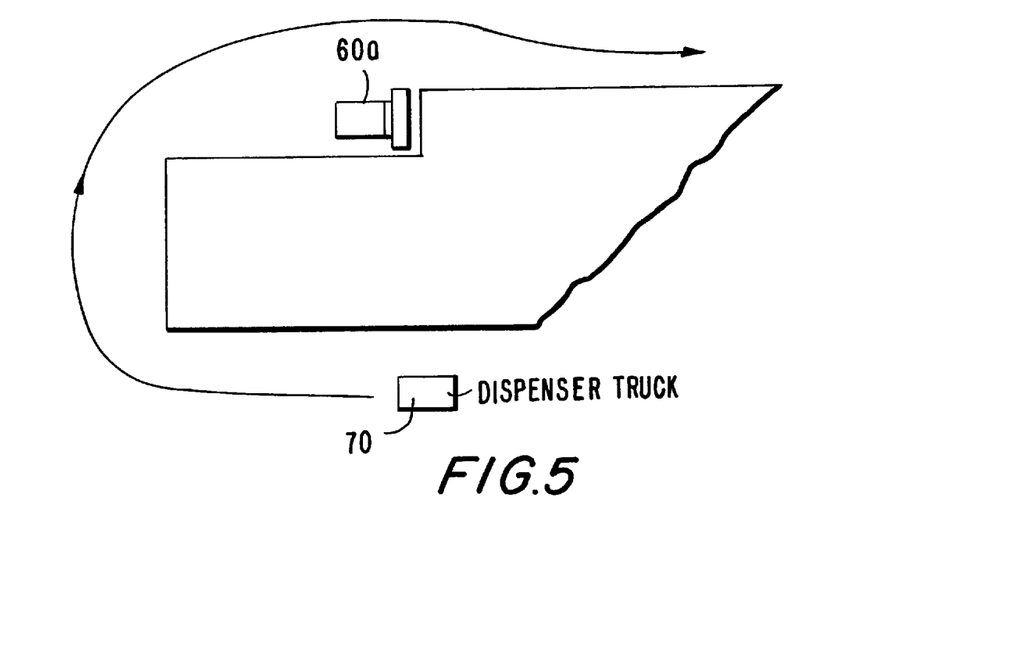
FIG. 5 is a diagram showing the synchronization of two work vehicles.

FIG. 5 shows the synchronization between the position and speed of the combine 60a and the refueling vehicle 70 in order to allow a parallel refueling. This synchronization may be predetermined by the automatic route planning system.

Figure 6:
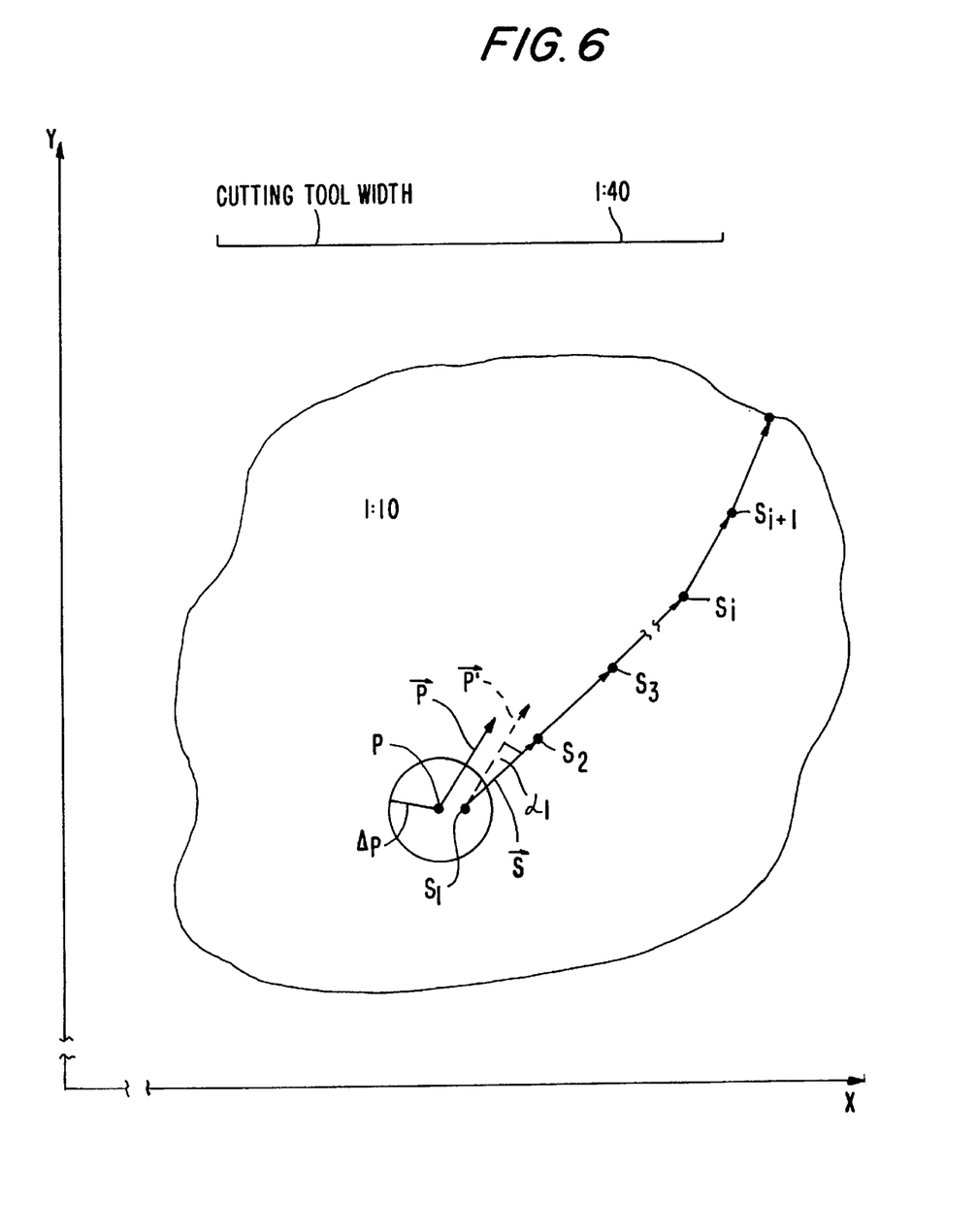
FIG. 6 is a detailed diagrammatic view of a section of a work route.

FIG. 6 shows a detailed sectional view of the working route. The coordinates of the work route are arranged as set value or desired value positions $\vec{S};X_s,Y_s)$ with a spacing for example in this embodiment of 20 cm. Each set position is correlated with a set working direction vector $\vec{S}$. The momentary position $\vec{P};X_p,Y_p)$ of the reference point on the work vehicle and the travel direction vector $\vec{P}$ is also shown. The precision ($\Delta P$) of the position determination in the GPS system is similarly shown. For generation of a steering signal in the tracking system or guidance system the difference between the momentary position of the work tool and the set value according to the planed work route is minimized by the control circuit. The variable $((X_p-X_s)+(Y_p-Y_s))^2$ used as control criterion is minimized. An additional control criterion, which is combined with the above-described criterion, is the minimization of the angular variation or deviation a, of the set work direction vector $\vec{S}$ and the actual travel direction vector $\vec{P}$. The angular deviation is for example described by the scalar product of the vectors $\vec{S}$ and $\vec{P}$: $\vec{S}*\vec{P}$=constant*cos a. When the angular deviation is zero, the scalar product has its maximum value.

Figures 7, 8:
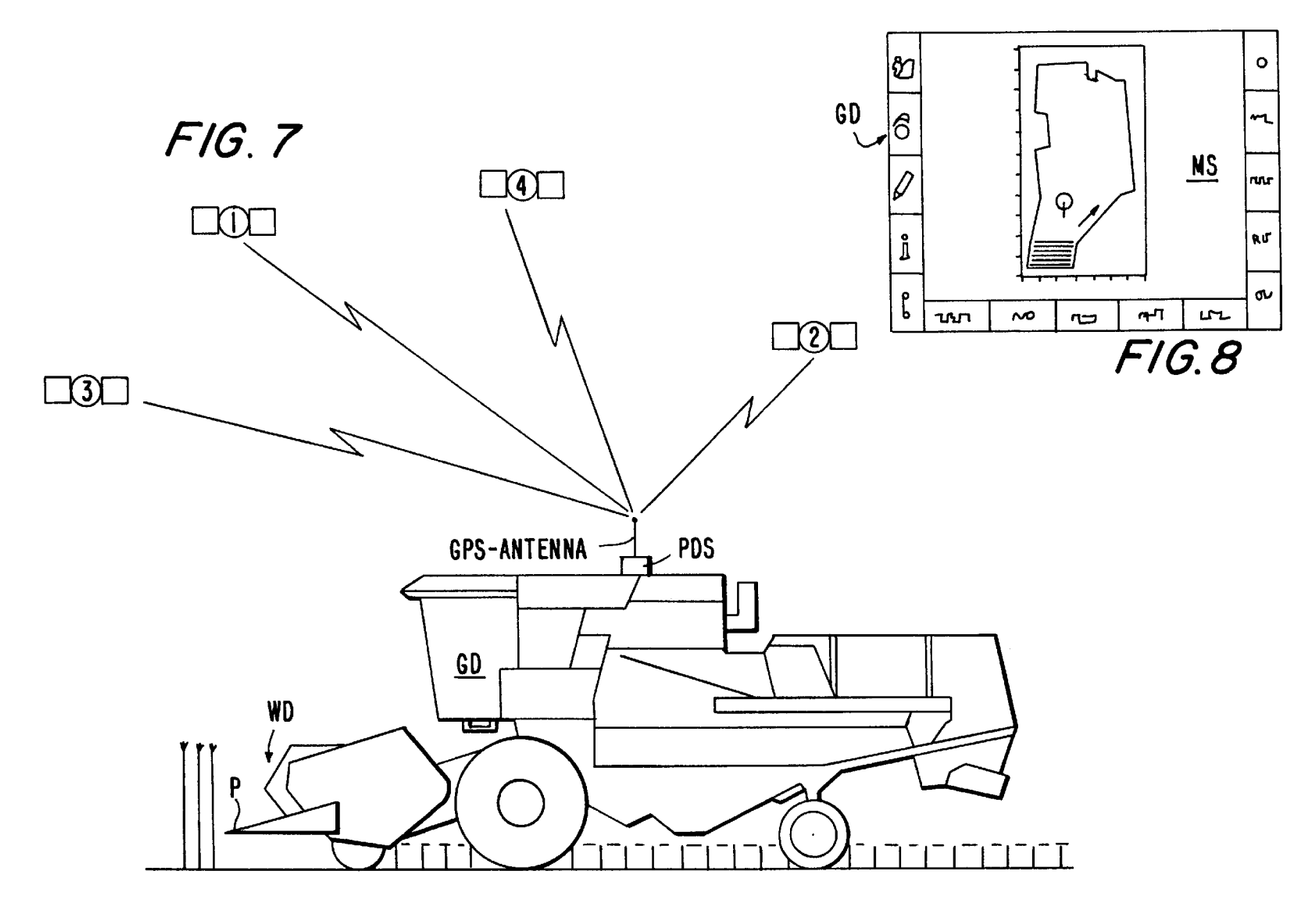
FIG. 7 is a side plan view of a work vehicle with a GPS-antenna and reference point.
FIG. 8 is a diagrammatic plan view of a monitor screen in a vehicle cabin on which a work route is displayed.

FIG. 7 shows the side view of a combine 60a with a GPS receiver antenna arranged on the work vehicle roof and a reference point on the left cutter division point. The combine shown in FIG. 7 has a field working device WD in the form of a cutting tool acting to harvest the agricultural material on the field and a graphical display device GD whose monitor screen MS is shown in FIG. 8 with a field displayed on it. The GPS antenna indicated in FIG. 7 is connected with a high precision real time position determining device PDS which, in turn, is connected with the computer processing the algorithm.

FIG. 8 shows the stationary or portable monitor arranged in the vehicle cabin for displaying the work route and the momentary position of the work vehicle on the field.

While the invention has been illustrated and described as embodied in a route planning system for agricultural work vehicles, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A route planning method for agricultural work vehicles having a definite working width for generation of at least one work path or track over a field, said route planning method comprising the steps of:
   a) inputting at least one field-specific datum and at least one work vehicle-specific datum into an electronic data processing unit;
   b) providing a computational algorithm in said electronic data processing unit for generation of the at least one work path or track, said computational algorithm including at least one optimization criterion for the at least one work path or track; and
   c) generating said at least one work path or track by executing said computational algorithm to obtain said at least one work path or track in the form of at least one digitized work route using said at least one field-specific datum and said at least one work vehicle-specific datum, wherein said at least one optimization criterion comprises at least one of the following: determination of a shortest work vehicle route over the field, determination of a fastest work vehicle route over the field, determination of a most fuel saving work vehicle route over the field and determining a work vehicle route over the field which minimizes at least one of lost time and vehicle travel distance for unloading/dispensing of harvested material.

2. A route planning method for agricultural work vehicles having a definite working width for generation of at least one work path or track over a field, said route planning method comprising the steps of:
   a) inputting at least one field-specific datum and at least one work vehicle-specific datum into an electronic data processing unit;
   b) providing a computational algorithm in said electronic data processing unit for generation of the at least one work path or track, said computational algorithm including at least one optimization criterion for the at least one work path or track; and
   c) generating said at least one work path or track by executing said computational algorithm to obtain said at least one work path or track in the form of at least one digitized work route using said at least one field-specific datum and said at least one work vehicle-specific datum, wherein said at least one optimization criterion comprises minimizing at least one of the lost time and vehicle travel distance for loading materials to be dispensed from an agricultural work vehicle on the field, wherein said work vehicle dispenses at least one of seeds, fertilizers and plant protecting or weed killing materials on the field.

3. The route planning method as defined in claim 1 or 2, wherein said at least one field-specific datum comprises coordinates for edges of said field.

4. The route planning method as defined in claim 2, further comprising taking said coordinates of said field edges from a cadastral or field map.

5. The route planning method as defined in claim 2, further comprising determining said coordinates of said field edges and storing said coordinates in said electronic data processing unit, wherein said determining said coordinates occurs by at least one of the following: optically scanning a cadastral or field map by means of a scanner or by contacting said cadastral or field map with a digital pen, traveling over the field edges with a work vehicle provided with a position determining device which continuously determines and stores said coordinates in a memory and sending an individual carrying an operating mobile GPS receiver around the field edges to continuously determine positions of the individual along the field edges so that at least one of all corner points and side lengths of said field are obtained.

6. The route planning method as defined in claim 3, further comprising calculating a total surface area of said field with the aid of said coordinates for the field edges.

7. The route planning method as defined in claim 6, wherein said total surface area is calculated considering variations in ground height over the field.

8. The route planning method as defined in claim 1 or 2, wherein said at least one work vehicle-specific datum comprises said working width for said at least one work path or track.

9. The route planning method as defined in claim 1 or 2, wherein said position determining device consists of a satellite navigation or GPS receiver.

10. The route planning method as defined in claim 1 or 2, wherein said at least one field-specific datum includes at least one of the following: digital land relief data including height information for the field edges and information regarding slope or inclination of ground in the field; information regarding position and size of hindrances for an agricultural machine working the field including trees, stones, brooks, pools and power line poles; information regarding areas bounding the field to be worked including other fields, paths and roads which can be used for turning maneuvers; information regarding harvest yield per unit area of the field; information regarding harvest yield cadastre of the field; information regarding harvested crop on the field; information regarding soil and soil properties of the field; soil property cadastre of the field; information regarding earlier or past work course plans for the field in chronological order; information including work route of seed planting vehicles used to plant a crop being harvested on the field and information regarding fixed harvested goods-unloading positions.

11. The route planning method as defined in claim 1 or 2, wherein said at least one work vehicle-specific datum includes at least one of the following: geometric dimensions of at least one work vehicle; information regarding reaction of the at least one work vehicle to a predetermined impact or deflection of a steering axle of the at least one work vehicle; information regarding drive performance of the at least one work vehicle; information regarding efficiency of at least one working device on the at least one work vehicle; maximum speed of the at least one work vehicle; information regarding optimum vehicle speed of the at least one work vehicle for given soil conditions; information regarding optimum vehicle speed of at least one work vehicle harvesting a certain crop as determined by crop type; information regarding optimum vehicle speed for certain crop yield densities; information regarding consumption value of consumed materials including fuel, seeds and liquids to be produced; information regarding fuel tank capacity; information regarding grain tank capacity and grain tank emptying speed in the case of a combine or of a carting vehicle accompanying the combine; information regarding maximum usage time limited by required maintenance time intervals and information regarding travel track width, travel lane width, tire width, border inclination angle and slope angle.

12. The route planning method as defined in claim 1 or 2, wherein said at least one digitized work route consists of a plurality of agricultural work vehicle travel tracks for a plurality of work vehicles working the field.

13. The route planning method as defined in claim 1 or 2, further comprising indicating a position or positions at which a grain holding tank of a combine is estimated to be filled when an agricultural machine is harvesting grain on the field and filling the grain holding tank.

14. The route planning method as defined in claim 1 or 2, wherein said at least one work path is determined for a harvesting vehicle passing over the field to harvest a crop, and further comprising determining a satisfactory parallel track for a refueling vehicle which refuels a fuel tank of the harvesting machine.

15. The route planning method as defined in claim 1 or 2, wherein said at least one optimization criterion comprises determining a safest work vehicle route over the field.

16. The route planning method as defined in claim 1 or 2, wherein said at least one work path or track generated covers only at least one selected part of the field.

17. The route planning method as defined in claim 1 or 2, wherein said at least one work path or track generated covers only a section of the field parallel to a travel lane.

18. The route planning method as defined in claim 1 or 2, wherein said at least one work path or track generated covers only a section of the field having a section width equal to an integral multiple of a working width of a work vehicle traveling over the at least one work path or track.

19. The route planning method as defined in claim 1 or 2, further comprising a coordinated plan for the travel of a plurality of agricultural work vehicles over the field including generating one of said at least one digitized work route using said at least one optimization criterion, said coordinated plan including information regarding planned work vehicle travel sequence, spacing of said work vehicles in a travel direction and transverse to the travel direction.

20. The route planning method as defined in claim 19, further comprising preparing instructions for turning maneuvers.

21. The route planning method as defined in claim 1 or 2, further comprising determining an area on said field still be worked at at least one position on said digitized work route.

22. The route planning method as defined in claim 1 or 2, further comprising providing a graphical display device in an agricultural work device traveling over said at least one digitized work route.

23. The route planning method as defined in claim 1 or 2, wherein said at least one digitized work route is prepared in a yard station computer containing said computational algorithm.

24. The route planning method as defined in claim 23, further comprising transferring said at least one digitized work route from said yard station computer to an on-board computer provided on an agricultural work vehicle assigned to travel over said at least one digitized work route by means of a portable data transfer device.

25. The route planning method as defined in claim 24, wherein said portable data transfer device is a diskette, chip card or PCMCIA card.

26. The route planning method as defined in claim 23, further comprising transferring said at least one digitized work route from said yard station computer to an on-board computer provided on an agricultural work vehicle assigned to travel over said at least one digitized work route by means of a radio.

27. The route planning method as defined in claim 1 or 2, wherein said electronic data processing unit comprises a on-board compound on a work vehicle traveling over said at least one digitized work route.

28. The route planning method as defined in claim 27, further comprising transferring said at least one field-specific datum and said at least one work vehicle-specific datum for preparation of said at least one digitized work route by means of a portable data carrier to said on-board computer.

29. The route planning method as defined in claim 27, further comprising transferring said at least one field-specific datum and said at least one work vehicle-specific datum for preparation of said at least one digitized work route by means of a radio device to said on-board computer.

30. The route planning method as defined in claim 27, further comprising storing said at least one work vehicle-specific datum in a memory of said on-board computer and retrieving said at least one work vehicle specific datum from said memory for preparation of said at least one digitized work route.

31. The route planning method as defined in claim 27, further comprising inputting said at least one work vehicle specific datum into said electronic data processing unit manually by a driver.

32. The route planning method as defined in claim 27, further comprising transforming said at least one digitized work route into coordinates of a real time position determining system installed on a work vehicle traveling over the at least one digitized work route.

33. The route planning method as defined in claim 32, wherein said real time position determining system is a GPS system.

34. The route planning method as defined in claim 32, further comprising deriving a work vehicle direction vector from all coordinate points of said at least one digitized work route.

35. The route planning method as defined in claim 1 or 2, wherein said at least one digitized work route comprises a plurality of coordinates for successive positions of a center of a work vehicle traveling over said at least one digitized work route in a real time position determining system.

36. The route planning method as defined in claim 1 or 2, wherein said at least one digitized work route comprises a plurality of coordinates for successive positions of a center of a work-performing device on a work vehicle traveling over said at least one digitized work route in a real time position determining system.

37. The route planning method as defined in claim 36, wherein said work-performing device is a cutting tool of a combine.

38. The route planning method as defined in claim 1 or 2, wherein said at least one digitized work route comprises a plurality of coordinates for successive positions of a left edge part of a work-performing device on a work vehicle traveling over said at least one digitized work route in a real time position determining system.

39. The route planning method as defined in claim 38, wherein said left edge part consists of a left blade part cutting edge of a cutting mechanism of a combine.

40. The route planning method as defined in claim 1 or 2, wherein said at least one digitized work route comprises a plurality of coordinates for successive positions of a right edge part of a work-performing device on a work vehicle traveling over said at least one digitized work route in a real time position determining system.

41. The route planning method as defined in claim 40, wherein said right edge part consists of a right blade part cutting edge of a cutting mechanism of a combine.

* * * * *